Sept. 17, 1957  G. W. ARMSTRONG  2,806,489
VALVE AND BAG LOADER
Filed April 22, 1955

*INVENTOR.*
GEORGE W. ARMSTRONG
BY *Toulmin & Toulmin*
ATTORNEYS 2,806,489
Patented Sept. 17, 1957

2,806,489

VALVE AND BAG LOADER

George Wendell Armstrong, Fairborn, Ohio, assignor to O. B. Armstrong and Son Company, Fairborn, Ohio, a corporation of Ohio Application April 22, 1955, Serial No. 503,772

7 Claims. (Cl. 141—317)

This invention relates to valves especially adapted for use on hoppers containing grain or other flowable granulated materials and to a bag loader adapted for use in combination with the said valve.

The dispensing of grains and similar fairly fluid granulated materials from hoppers and the like is ordinarily controlled by a valve mechanism in a discharge opening leading from the hopper with the valve ordinarily being the type that slides in a straight line.

Valves of this nature are quite satisfactory for controlling the flow when they are adjusted to their various positions but possess certain outstanding disadvantages.

One disadvantage of a flat slide valve of this type is that the entire weight of the material pressing thereagainst must be carried by the guide ways in which the valve slides, thus leading to a resistance of the valve member to move and also leading to excessive wear of the valve member and the guides therefor.

Still another disadvantage of a flat valve member of the nature referred to is that the valve member must be reinforced or made of heavy material in order to prevent warping and bending and possible failure of the valve member when the weight which it supports is extremely heavy.

Having the foregoing in mind, it is a particular object of the present invention to provide a valve structure for controlling the flow of grains and other flowable granulated materials which will avoid the difficulties referred to above that have characterized valve structures that are presently known in the art.

A still further object is the provision of a valve structure of the nature referred to which is extremely easy to operate and will remain in any adjusted position.

Another particular object of this invention is the provision of a valve structure of the nature referred to which is substantially free of wear and thus has extremely long life.

Another object of this invention is the provision of a combination of a valve of the nature referred to together with a novel bag supporting arrangement to enable a workman readily to support a bag beneath the valve whereby the combination forms an extremely convenient bag loader.

It is also an object to provide in combination with a valve such as described, means associated with the housing thereof for supporting a bag to be filled by a material controlled by the valve.

A still further object is the provision of a valve structure of the nature referred to which is relatively inexpensive to construct and which can readily be installed on most existing storage equipment.

These and other objects and advantages will become more apparent upon reference to the following description taken in connection with the accompanying drawings, in which.

Figure 2:
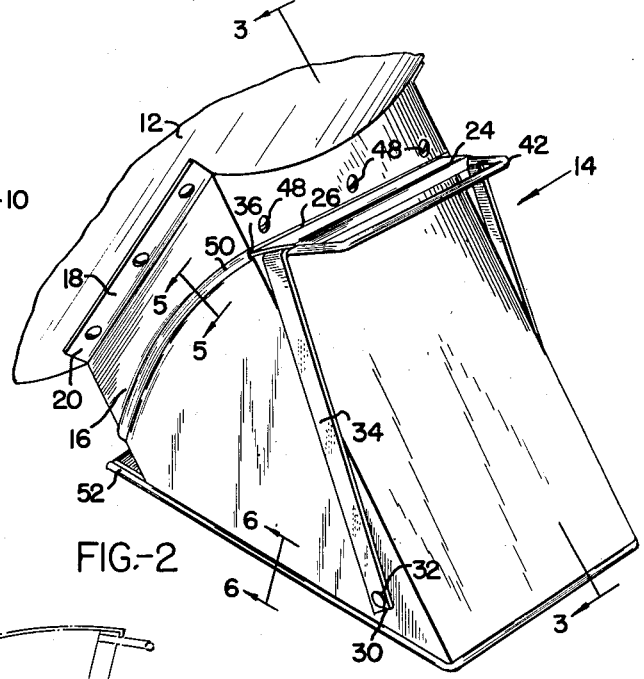
Figure 2 is a somewhat enlarged perspective view showing the bag loader and valve in elevation.
Figures 5, 6:
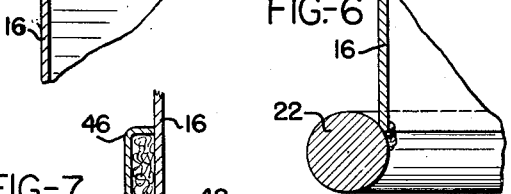
Figure 5 is a sectional view indicated by line 5—5 on Figure 2 showing the manner in which the valve member fits within a recess in the side wall of the valve housing.
Figure 7:
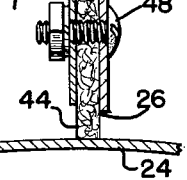
Figure 4:
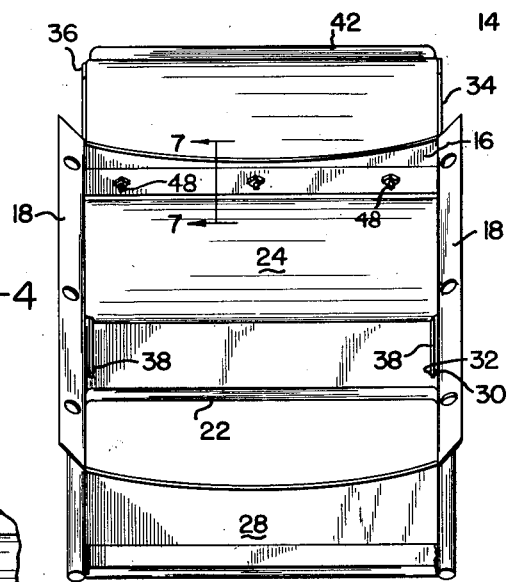
Figure 4 is a plane view moving in on the valve and bag loader structure in about the direction of the arrow 4 in Figure 3.

Figure 6 is a sectional view indicated by line 6—6 on Figure 2 showing a bead formed about the discharge opening of the valve housing and forming a part of the bag loader according to this invention; and Figure 7 is a sectional view indicated by line 7—7 on Figure 4 showing a seal arrangement associated with the movable valve member of the valve at the point where it emerges from the valve housing.

Figure 1:
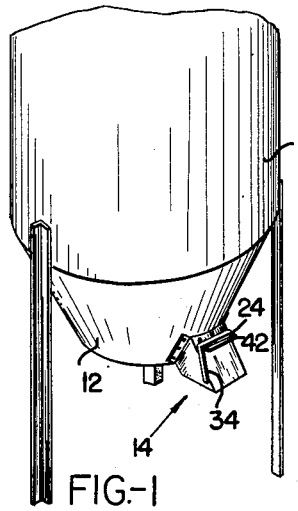
Figure 1 is a perspective view of a feed hopper or the like having a valve and bag loader combination according to the present invention associated therewith.

Referring to the drawings somewhat more in detail, Figure 1 shows a feed hopper or bin 10 or this may be a storage compartment for any sort of granular flowable material which might consist of grain, ground feed, granulated coal, sand, gravel or any of several other such materials.

Hopper 10 is provided with a conical bottom portion 12 having a discharge opening therein to which is fitted the valve structure 14 of the present invention.

With reference to Figures 2 to 7, it will be revealed that the valve structure comprises a housing part 16 having flange means as at 18 for connection with the feed hopper as by means of the screws 20. Housing 16 forms a discharge passageway generally rectangular in cross section which preferably terminates in a horizontally disposed opening 22 at the bottom thereof.

According to the present invention, the passage of material through the discharge passage formed by the valve housing is controlled by an arcuate valve member 24.

Valve member 24 is adapted for passing through a transverse slot 26 in the upper front wall of the valve housing and when the passageway is closed, the valve member abuts the lower rear wall of the valve housing as at 28.

According to the present invention, valve member 26 is formed as a portion of a cylinder about an axis 30 on which axis are located the pivot pins 32 in the side walls of the valve housing.

Externally of the valve housing a bar 34 at each side of the said housing engages the pivot pin at the bottom and is connected with the outermost edge of the valve member at the top. These bars 34 may advantageously consist of a U-shaped strap member having a portion extending transversely across beneath the outer edge of the valve member as at 36.

Inside the housing and also having their one ends connected to the pivot pins 32 are other bars 38 leading up to and connected with the inner edge of valve member 26. Bars 38 may also take the form of a U-shaped strap member having a portion extending transversely across beneath the rear edge of the valve member and connected therewith as at 40.

The outer edge of the valve member is preferably formed over the edge of the horizontal portion of the strap that is connected with the bars 34 and extending outwardly from this edge of the valve member is a handle 42 by means of which the valve member is moved about pivot axis 30 for opening and closing the discharge passage through the valve.

The slot through which the valve member extends is preferably sealed by a rubberlike seal strap 44 clamped to the front wall of the valve housing by the angular clip 46 and screws 48.

This element is preferably inside the valve housing but may be positioned outside if desired.

The side edges of the valve member are preferably received in arcuate grooves 50 pressed into the side walls of the valve housing thereby to provide an efficient seal between the valve member and the side walls of the valve housing to prevent the material controlled by the valve member from trickling therethrough.

The present invention also contemplates the provision of a bag supporting arrangement which has particular utility in connection with the valve of the present invention.

The bag loader portion of the structure comprises the beads 22 which extend laterally outwardly from the side walls of the valve housing as will be particularly noted in Figure 6.

This bead may quite conveniently be formed by using a rod or tubing and bending it to a U-shape so that a portion extends across beneath the forwardmost tip of the valve member and the legs thereof extend along the sides of the valve member as will be seen in Figure 2.

The portions of the U-shaped bar along the side edges of the valve member project outwardly therefrom to provide support for a bag, but that portion extending across the front of the valve housing can be located therebeneath since the inclined front wall of the valve housing will provide support for a bag as will be seen hereinafter.

Figure 3:
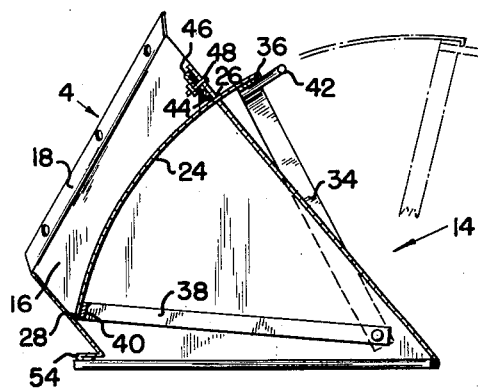
Figure 3 is a sectional view through the valve and bag loader indicated by line 3—3 on Figure 2.

The ends of the legs of the U-shaped rod project rearwardly of the back wall of the valve 52 and extending transversely therebetween is a portion of the back wall of the housing which are been turned backwardly and then the edge rolled under as will be seen at 54 in Figure 3. This transversely extending flat portion could, of course, be formed by a separate bar or strap if desired.

It will be apparent from the foregoing description and the illustrations of the valve that all of the thrusts on the valve member, due to the material within the hopper which it supports, will be carried by the bars 32 and 34 and that the valve member will not be pressed against the guide ways 50 provided in the walls of the valve housing therefor.

Because of this the valve member is very easy to shift in any direction at any time regardless of the material within the hopper or the weight which the material bears on the valve member.

It will also be apparent that the valve member will remain in any position to which it is adjusted because all of the thrusts imposed thereon are radial and are borne directly on pivot pins 32.

The bars 38 disposed closely inside the side walls of the valve member will act as straightening elements to keep the side walls of the valve member free of dust and particles of the material flowing through the valve at all times.

The bag loader portion of the valve structure is utilized by placing a bag, either paper or cloth, about the open lower end of the valve housing and gathering the mouth of the bag at the front of the valve housing whereby an extreme upper edge of the bag will be retained about the valve housing above the bead formed by the U-shaped bar about the mouth of the valve outlet and the flat portion at 54 across the back. A bag so supported on the mouth of the valve can be held thereon easily until completely filled.

The holding up of the bag on the valve can readily be done with one hand and the valve member controlled with the other so that the combination, according to this invention, provides an extremely convenient bag loader.

It will be apparent that the exact structure of the valve, particularly as to the housing thereof at the inlet end, could readily be modified to adapt it to different types of hoppers or storage bins without departing from any of the principles of this invention.

It will be understood that this invention is susceptible to modification in order to adapt it to different usages and conditions, and, accordingly, it is desired to comprehend such modifications within this invention as may fall within the scope of the appended claims.

I claim:

1. In a valve of the nature described; a valve housing generally rectangular in cross section forming a discharge passage, a slot in the front wall of said housing, an arcuate valve member extending into said housing through said slot and movable for opening and closing said slot, said valve member being in the form of a portion of a cylinder the axis of which is adjacent the lower end of said housing, pivot pins in said housing on said axis, a first pair of bars extending from said pivot pins to the outer edge of said valve member externally of said housing, and a second pair of bars extending from said pivot pins to the inner edge of said valve member internally of said housing, the said bars internally of said housing being located closely adjacent thte walls of said housing to keep said housing free of an accumulation of dust or the like, there being arcuate recesses in the side walls of said housing sealingly to receive the side edges of said valve member.

2. In a valve for controlling the flow of granular materials such as seed or grain or the like; a sheet metal valve housing generally rectangular in cross section forming a discharge passage and having means at its upper end for connection of the valve housing with a hopper or storage bin or the like, the lower end of said valve housing terminating in a discharge opening positioned in a substantially horizontal plane, the front wall of said valve housing having a transverse slot therein, an arcuate valve member in the form of a portion of a cylinder concave downwardly extending into said slot and movable for opening and closing said passage, the center of curvature of said valve member being positioned within the limits of said housing adjacent to the bottom thereof, pivot pins in said housing on said center of curvature, and bar means extending from said pivot pins wholly externally of said housing to the outer edge of said valve member and wholly internally thereof to the inner edge of said valve member whereby all thrusts of said valve member are sustained on said pivot pins.

3. In a valve for controlling the flow of granular materials such as seed or grain or the like; a sheet metal valve housing generally rectangular in cross section forming a discharge passage and having means at its upper end for connection of the valve housing with a hopper or storage bin or the like, the lower ends of said valve housing terminating in a discharge opening positioned in a substantially horizontal plane, the front wall of said valve housing having a transverse slot therein, an arcuate valve member in the form of a portion of a cylinder concave downwardly extending into said slot and movable for opening and closing said passage, the center of curvature of said valve member being positioned within the limits of said housing adjacent to the bottom thereof, pivot pins in said housing on said center of curvature, and bar means extending from said pivot pins externally of said housing to the outer edge of said valve member and internally thereof to the inner edge of said valve member whereby all thrusts on said valve member are sustained on said pivot pins, the side walls of said valve member comprising arcuate recesses and the side edges of said valve member extending into said recesses to provide a seal at the said side edges of the valve member.

4. In a valve for controlling the flow of granular materials such as seed or grain or the like; a sheet metal valve housing generally rectangular in cross section forming a discharge passage and having means at its upper end for connection of the valve housing with a hopper or storage bin or the like, the lower ends of said valve housing terminating in a discharge opening positioned in a substantially horizontal plane, the front wall of said valve housing having a transverse slot therein, an arcuate valve member in the form of a portion of a cylinder concave downwardly extending into said slot and movable for opening and closing said passage, the center of curvature of said valve member being positioned within the limits of said housing adjacent to the bottom thereof, pivot pins in said housing on said center of curvature, and bar means extending from said pivot pins externally of said housing to the outer edge of said valve member and internally thereof to the inner edge of said valve member whereby all thrusts on said valve member are sustained on said pivot pins, there being flexible sealing means between said valve member and said valve housing along the top of said slot, and the side walls of said housing being formed with grooves sealingly receiving the side edges of said valve member.

5. In a valve for controlling the flow of granular materials such as seed or grain or the like; a sheet metal valve housing generally rectangular in cross section forming a discharge passage and having means at its upper end for connection of the valve housing with a hopper or storage bin or the like, the lower ends of said valve housing terminating in a discharge opening positioned in a substantially horizontal plane, the front wall of said valve housing having a transverse slot therein, an arcuate valve member in the form of a portion of a cylinder concave downwardly extending into said slot and movable for opening and closing said passage, the center of curvature of said valve member being positioned within the limits of said housing adjacent to the bottom thereof, pivot pins in said housing on said center of curvature, and bar means extending from said pivot pins externally of said housing to the outer edge of said valve member and internally to the inner edge of said valve member whereby all thrusts of said valve member are sustained on said pivot pins, groove means formed in the side walls of said valve housing into which the side edges of the valve member extends, and there being sealing means between the upper surface of said valve member and the valve housing at said slot.

6. In a bag loader; a valve of the nature described comprising a rectangular valve housing extending downwardly and forwardly at an angle and terminating in a substantially horizontal discharge opening, and means forming a bead around at least three sides of said opening of said valve housing for supporting a bag when drawn about the said opening said bead comprising a horizontal portion projecting from the back of the housing and a U-shaped rod fixed across the front of the housing and along the sides thereof so as to project from the said sides.

7. In combination; a valve of the nature referred to having a substantially rectangular housing terminating in a substantially horizontal discharge opening, the front wall of said housing being inclined toward the rear, a valve member in said valve housing for controlling the flow of material therethrough, and means for supporting a bag about the mouth of said valve housing comprising beads extending outwardly from the side walls of said valve housing, and a substantially flat portion extending rearwardly from the back wall of said valve housing between said beads whereby a bag drawn about the mouth of said valve housing and gathered at said front wall will be supported thereon.

References Cited in the file of this patent
UNITED STATES PATENTS

| | | |
|---|---|---|
| 1,441,608 | Stewart | Jan. 9, 1923 |
| 1,639,517 | Lassen | Aug. 16, 1927 |
| 1,907,773 | Fisher et al. | May 9, 1933 |
| 2,317,007 | Weinger | Apr. 20, 1943 |